Patented Feb. 20, 1940

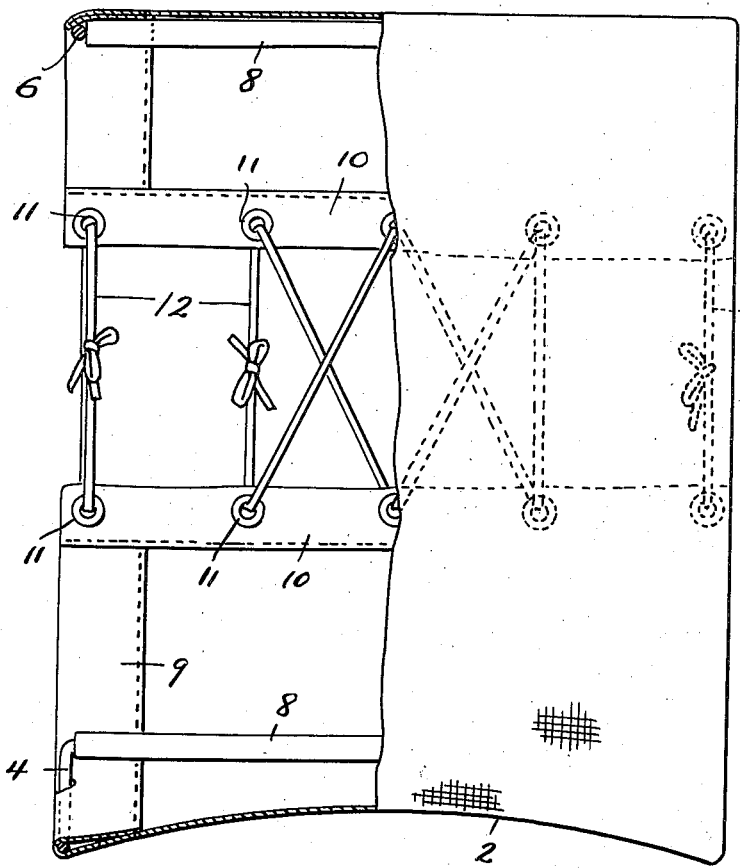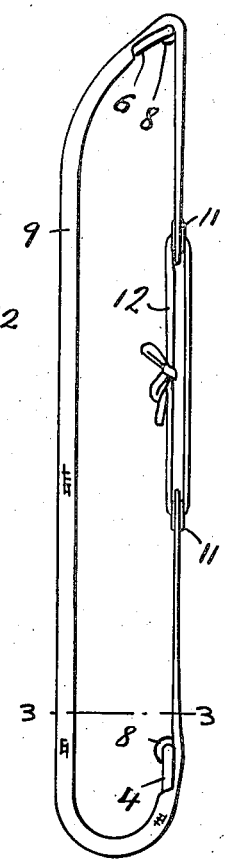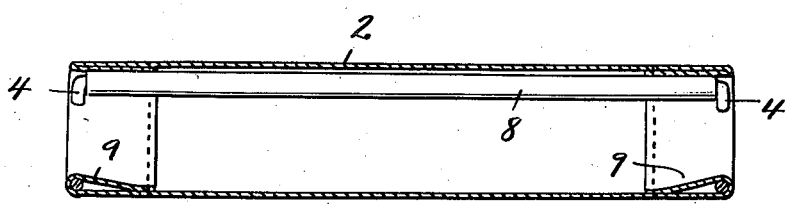

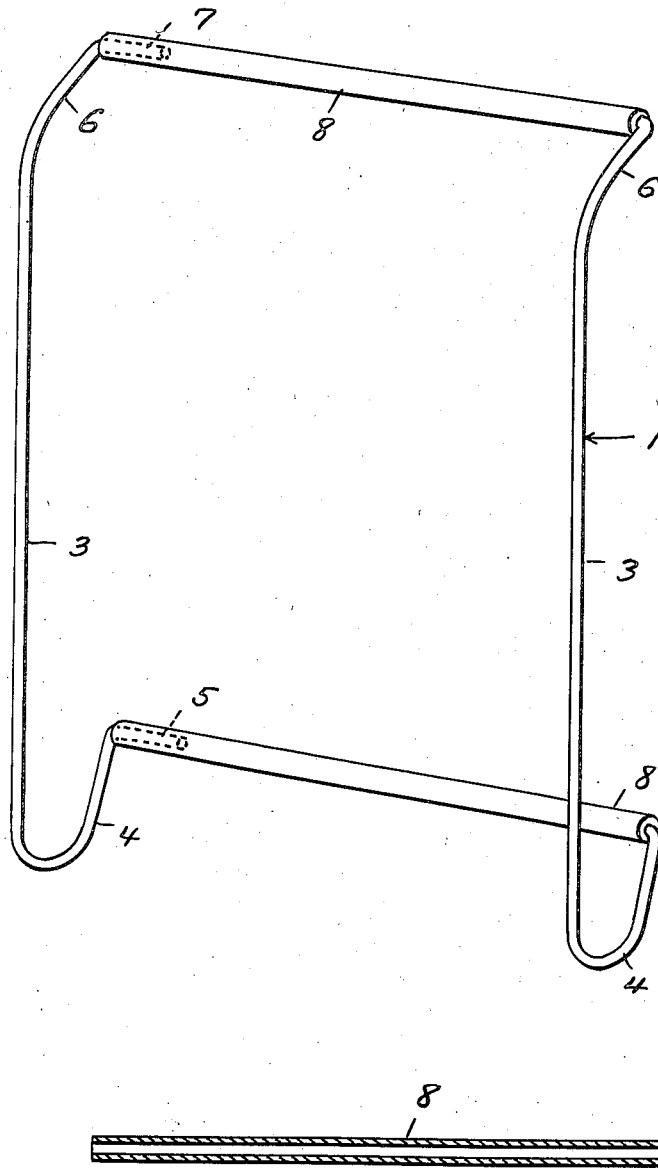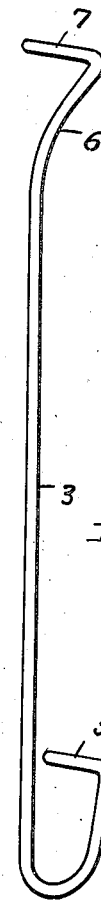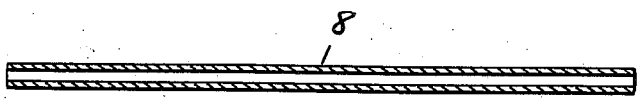

2,191,360

UNITED STATES PATENT OFFICE 2,191,360

BACK REST

Harvey O. Westenbarger, Sapulpa, Okla.

Application June 12, 1939, Serial No. 278,795

2 Claims. (Cl. 155—182)

The present invention relates to new and useful improvements in back rests particularly for automobile seats and has for its primary object to provide, in a manner as hereinafter set forth, a device of this character embodying a novel construction and arrangement whereby ample ventilation will be had, thus materially promoting comfort particularly in warm weather.

Another very important object of the invention is to provide a back rest of the aforementioned character including a fabric sheet, the construction and arrangement being such that said fabric sheet may be conveniently laundered when desired.

Other objects of the invention are to provide a ventilated back rest for automobile seats which will be comparatively simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view partially in vertical section and partially in front elevation, showing a ventilated back rest constructed in accordance with the present invention.

Figure 2 is a side elevation thereof.

Figure 3 is a view in horizontal section, taken substantially on the line 3—3 of Fig. 2.

Figure 4 is a perspective view of the frame.

Figure 5 is a detail view in perspective of one of the side members of the frame.

Figure 6 is a view in vertical longitudinal section through one of the metallic tubes constituting a part of the frame.

Referring now to the drawings in detail, it will be seen that the embodiment of the invention which has been illustrated comprises a frame which is designated generally by the reference numeral 1. Mounted on the frame 1 is a cover 2 of fabric or other suitable flexible material.

As illustrated to advantage in Fig. 4 of the drawings, the frame 1 includes a pair of duplicate side members or rods 3 of heavy, resilient wire having substantially U-shaped lower end portions 4. At their free ends, the U-shaped portions 4 of the side rods 3 terminate in inturned arms 5.

The rods 3 of the frame 1 further include rearwardly curved upper end portions 6 which terminate in inturned arms 7 similar to the arms 5. The arms 5 and 7 are engaged in the end portions of a pair of tubes 8 of suitable metal which connect the rods 3 of the frame.

The longitudinal marginal portions of the cover 2 are formed to provide hems 9 constituting pockets which accommodate the rods 3. This is shown to advantage in Figs. 1 and 3 of the drawings. Hems 10 are provided on the ends of the cover 2 and mounted therein are eyelets 11. The eyelets 11 accommodate laces 12 which connect the ends of the cover 2 and through the medium of which said cover is drawn tightly over the frame 1.

It is thought that the manner in which the device functions will be readily apparent from a consideration of the foregoing. The rest is, of course, placed against the back of the automobile seat and the fabric cover 2 supports the back of the user in spaced relation to the seat back, thus permitting the free circulation of air therebetween. The rods 3 emerge from the hems or pockets 9 in the cover 2 at points adjacent the arms 5 and 7, said cover 2 passing over the metallic tubes 8. The construction and arrangement of the frame 1 and the cover 2 thereon is such as to assure maximum comfort. The fabric cover 2 retains the members constituting the frame 1 in assembled relation and the tautness of said cover may be conveniently adjusted as desired through the medium of the laces 12.

It is believed that the many advantages of a ventilated back rest constructed in accordance with the present invention will be readily understood and although a preferred embodiment of the device is as illustrated and described, it is to be understood that change in the details of construction and in the combination and arrangement of parts may be resorted to which will fall within the scope of the invention as claimed.

What is claimed is:

1. A back rest comprising a frame including a pair of vertical side rods, said side rods comprising substantially U-shaped lower end portions, said side rods further including rearwardly directed upper end portions, connecting tubes extending between the end portions of the rods, inturned arms on the ends of the rods engaged in said tubes, and a flexible cover mounted on the frame, said cover including pockets on its vertical marginal portions enclosing the side rods, said cover passing over the tubes, and means connecting the ends of the cover together at the rear of the frame.

2. A ventilated back rest of the character described comprising a frame including vertical side rods, said side rods comprising substantially U-shaped lower end portions and further comprising rearwardly curved upper end portions, tubes extending between the ends of the rods, a fabric cover mounted on the frame and having its end portions passing over the tubes rearwardly thereof, hems on the vertical marginal portions of the cover enclosing the rods of the frame, and laces adjustably connecting the ends of the cover rearwardly of the frame.

HARVEY O. WESTENBARGER.